United States Patent [19]
Sekine et al.

[11] Patent Number: 5,579,045
[45] Date of Patent: Nov. 26, 1996

[54] APPARATUS FOR DETECTING MOVEMENT USING A DIFFERENCE BETWEEN FIRST AND SECOND IMAGE SIGNALS

[75] Inventors: Masayoshi Sekine, Tokyo; Toshiaki Kondo, Atsugi, both of Japan

[73] Assignee: Canon Kabushiki Kaisha, Tokyo, Japan

[21] Appl. No.: 231,972

[22] Filed: Apr. 21, 1994

Related U.S. Application Data

[63] Continuation of Ser. No. 50,729, Dec. 21, 1992, abandoned, which is a continuation of Ser. No. 798,946, Nov. 27, 1991, abandoned.

[30] Foreign Application Priority Data

Nov. 30, 1990 [JP] Japan ................... 2-333839

[51] Int. Cl.$^6$ .................................. H04N 5/225
[52] U.S. Cl. ........................... 348/208; 348/699
[58] Field of Search ........................ 348/699, 700, 348/701, 208

[56] References Cited

U.S. PATENT DOCUMENTS

| | | | |
|---|---|---|---|
| 3,603,725 | 9/1971 | Cutler | 358/136 |
| 3,890,462 | 6/1975 | Limb | 178/6.8 |
| 4,218,703 | 8/1980 | Netravali et al. | 358/105 |
| 4,270,143 | 5/1981 | Morris | 358/105 |
| 4,788,596 | 11/1988 | Kawakami et al. | 358/222 |
| 4,884,136 | 11/1989 | Ninomiya et al. | 358/105 |
| 4,939,685 | 7/1990 | Feintuch | 364/724.19 |
| 5,012,270 | 4/1991 | Sekine et al. | 354/430 |
| 5,031,049 | 7/1991 | Toyama et al. | 358/227 |
| 5,047,850 | 9/1991 | Ishii et al. | 358/105 |
| 5,107,293 | 4/1992 | Sekine et al. | 354/430 |
| 5,128,768 | 7/1992 | Suda et al. | 358/227 |
| 5,164,835 | 11/1992 | Yamada et al. | 358/227 |
| 5,198,896 | 3/1993 | Kondo et al. | 358/105 |

FOREIGN PATENT DOCUMENTS

| | | |
|---|---|---|
| 0177763 | 4/1986 | European Pat. Off. . |
| 1178916 | 7/1989 | Japan . |

*Primary Examiner*—Wendy Garber
*Attorney, Agent, or Firm*—Fitzpatrick, Cella, Harper & Scinto

[57] ABSTRACT

A movement detection apparatus comprises a first circuit for detecting a difference signal between first and second image signals, a second circuit for integrating the difference signal detected by the first circuit, a third circuit for detecting respective image signal levels of the first and second image signals when the image signals reach a predetermined level, a fourth circuit for detecting a difference signal of plural detection results given by the third circuit, and a fifth circuit for dividing the second circuit output signal by the fourth circuit output signal to detect a signal corresponding to image movement.

24 Claims, 8 Drawing Sheets

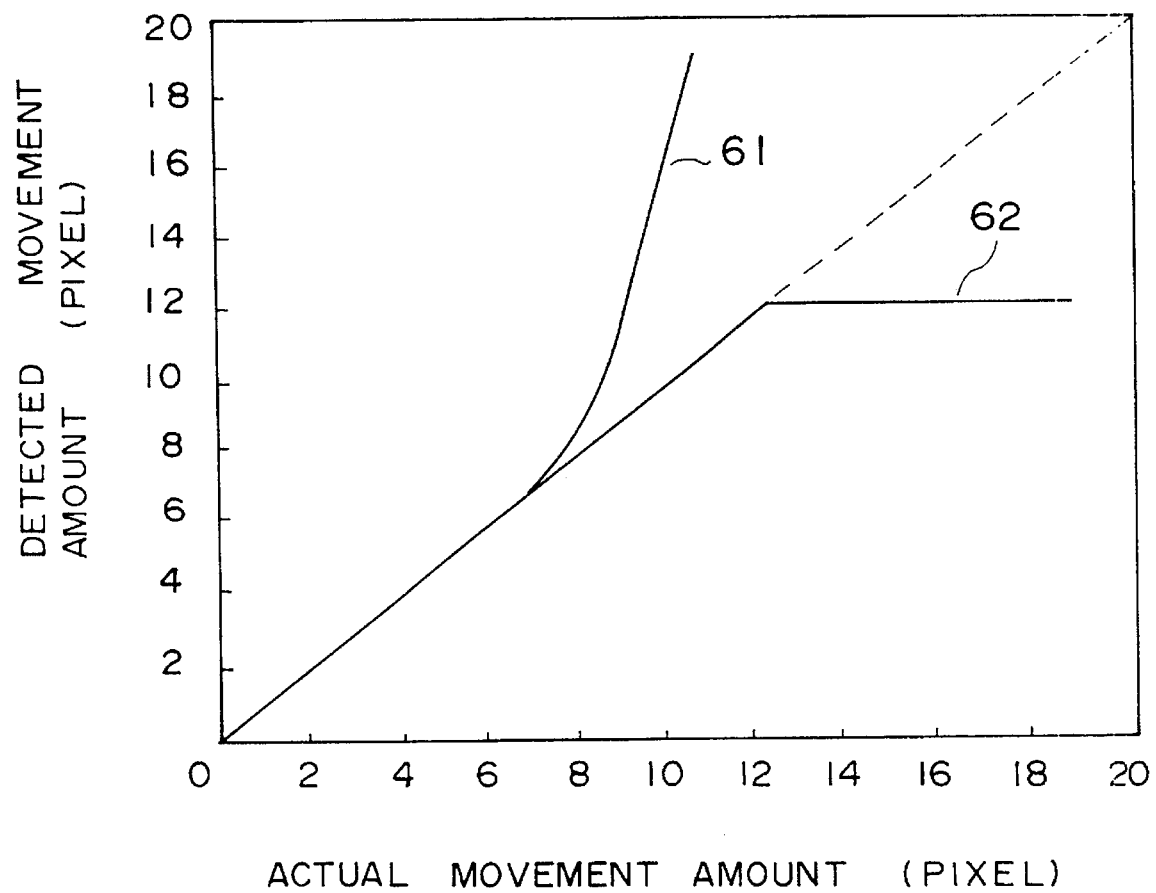
F I G. 7

APPARATUS FOR DETECTING MOVEMENT USING A DIFFERENCE BETWEEN FIRST AND SECOND IMAGE SIGNALS

This application is a continuation of application Ser. No. 08/050,729 filed Dec. 21, 1992, now abandoned, which in turn is a continuation of application Ser. No. 07/798,946 filed Nov. 27, 1991 now abandoned.

BACKGROUND OF THE INVENTION

1. Field of the Invention

The present invention is related to a movement detection apparatus suitably applicable to remote sensing by a TV camera, a moving image compression apparatus, a vibration-proof camera for correcting a vibratory motion of camera, etc.

2. Related Background Art

There are various methods and means for detecting movement of camera or subject. An example of movement vector detection apparatus using an image is described in U.S. Pat. No. 3,890,462.

That Patent discloses a method in which a luminance difference or interframe difference is obtained at a pixel from two sequential images, a space gradient is computed in a frame, and a movement amount is gained by division of the gradients per block.

The following formulae explain the above operation, where $\alpha$ stands for a movement amount in the x-direction and $\beta$ for that in the y-direction.

$$\alpha = (\underset{b}{\Sigma} \, d) / (\underset{b}{\Sigma} \, g_x'), \ldots \quad (1)$$

$$\beta = (\underset{b}{\Sigma} \, d) / (\underset{b}{\Sigma} \, g_y'), \ldots \quad (2)$$

In the formulae, b represents an operation block size and g(F, x, y) an image. A character F denotes a frame number and d a difference between two frames or a interframe difference. Space gradients are defined by $\partial g/\partial x = g_x'$ and $\partial g/\partial y = g_y'$.

This movement vector detection method has a problem in that the detection range of the movement amount is small, causing an extremely big detection error upon detection of a great movement amount. That is, a quick motion cannot be detected using a TV signal of a fixed frame rate.

FIG. 1 shows a simulation result of the movement detection operation applying the conventional method to an actual image.

The simulation assumptions are that a screen is composed of 512×512 pixels, and that a striped black and white pattern of 32 pixel period is photographed by a lens diameter of ten pixel circle of least confusion. A block size for the operation is 25 pixels.

As seen in FIG. 1, accurate detection of the movement amount is restricted within the actual movement of four to five pixels. Beyond the five pixel movement, the detection accuracy decreases so that detection values get away from the ideal characteristics. Moreover, in case that the actual movement amount is over eight pixels, the detection value becomes reduced. For example, at the twelve pixel actual movement, the detection value is about four pixels, which cannot be distinguished from the actual movement of four pixels.

Since the detection value becomes smaller upon greater actual movement, this apparatus shows a further greater detection error when calculating an acceleration or a difference per unit time between two movement amounts.

The detection range may be normalized by the pattern period $\lambda$ of a subject. An accurately detectable range is between $\lambda/4$ and $\lambda/6$, presenting a theoretical limit of performance of the conventional method.

Below are listed prior applications and patents of the present applicant concerning apparatus detecting movement like in the present invention.

| Application or Patent | Application date |
|---|---|
| U.S. Pat. No. 4788596 | |
| Japanese Patent Appln. Laid-open No. 1-178916 | |
| U.S. Ser. No. 880152 | 6/30/96 |
| U.S. Ser. No. 154078 | 2/9/88 |
| U.S. Pat. Nos. 5031049; 5,198,896; 4,939,685; 5,012,270; 5,107,293; 5,164,835; and 5,128,768 | |

SUMMARY OF THE INVENTION

The present invention has a purpose to solve the above-described problem, providing a movement detection apparatus with a simple hardware structure, a wide movement detection range, and a high detection precision.

According to a preferred embodiment of the present invention to attain the purpose, there is disclosed a movement detection apparatus comprising first means for detecting a difference signal between first and second image signals, second means for integrating the difference signal detected by said first means, third means for detecting respective image signal levels of said first and second image signals when the image signals reach a predetermined level, fourth means for detecting a difference signal of plural detection results given by said third means, and fifth means for dividing said second means output signal by said fourth means output signal to detect a signal corresponding to image movement.

Another purpose of the invention is to provide a video camera with a movement detection apparatus realizing a wide movement detection range and a high detection precision.

According to another preferred embodiment of the present invention to attain the purpose, there is disclosed a movement detection apparatus comprising image pickup means for converting an optical image into an electric signal to output an image signal, first operation means for outputting a difference signal between first and second image signals output by said image pickup means at different times, detection means for detecting an image signal level when said first and second image signals reach an identical level, second operation means for operating a difference signal of plural detection results given by said detection means, and third operation means for effecting a predetermined operation on output signals of said first and second operation means to output a signal corresponding to image movement.

Still another purpose of the present invention is to provide a video camera apparatus with the above movement detection apparatus.

Other purposes and specific features of the present invention will be clarified by the following details and drawings.

BRIEF DESCRIPTION OF THE DRAWINGS

FIG. 7 is a drawing to show a movement detection property of the apparatus as shown in FIG. 6.

DETAILED DESCRIPTION OF PREFERRED EMBODIMENTS

A movement detection apparatus of the present invention is described below with references to preferred embodiments thereof and accompanying drawings.

Figure 2:
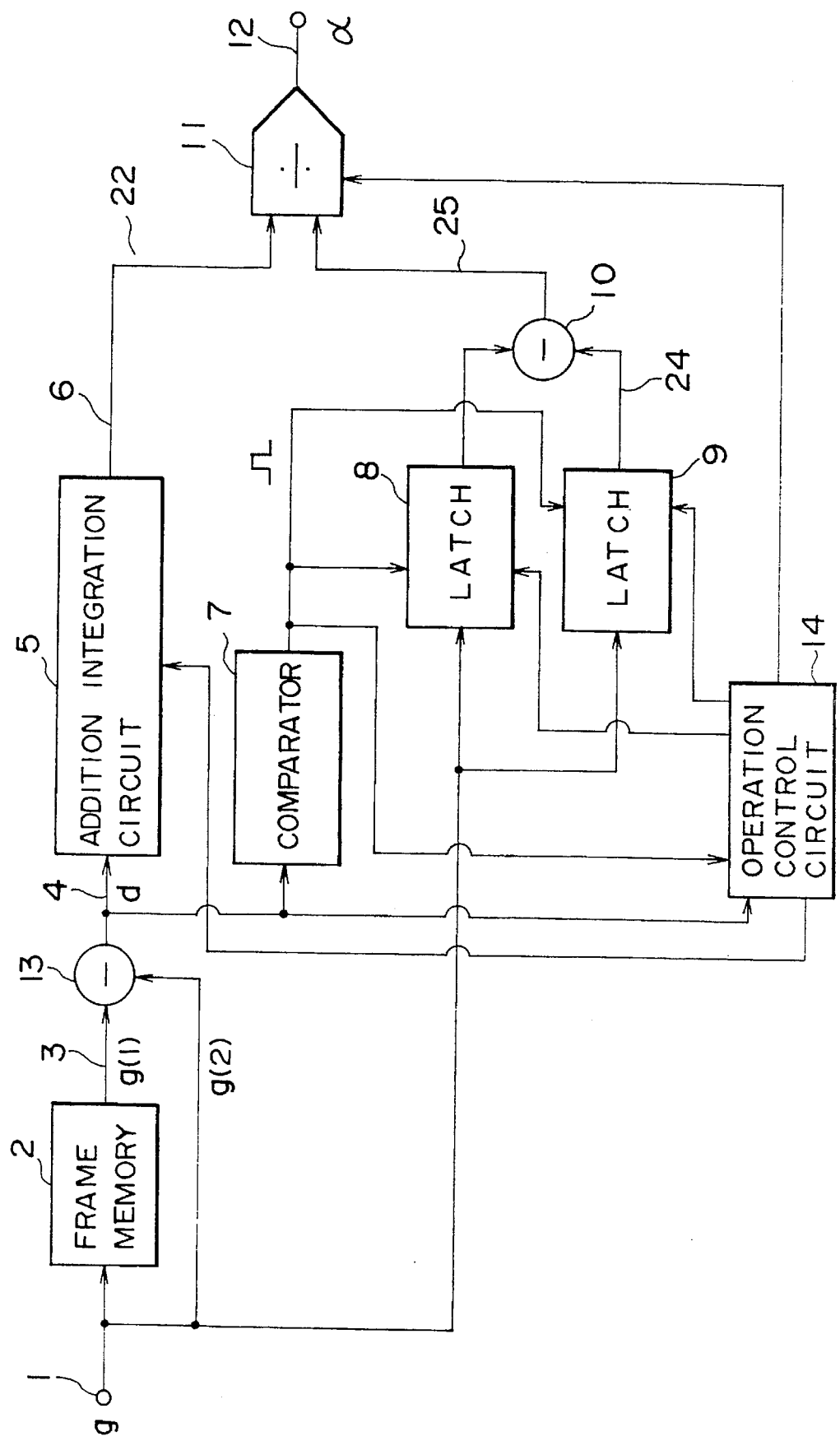
FIG. 2 is a block diagram to show a structure of a movement detection apparatus of the present invention.

FIG. 2 is a block diagram to show a structure of an embodiment of the movement detection apparatus of the present invention.

In FIG. 2, 1 denotes an image signal output by a camera system comprising an image pickup element, 2 a frame memory to store the image, 3 an image output signal read out of the frame memory 2, 13 a subtraction circuit to compute a difference between the image signal read out of the frame memory 2 and the present image signal, 4 a luminance difference signal output from the subtraction circuit 13, 5 an integration circuit to integrate the input signal thereinto, 6 an output signal of the integration circuit, 7 a comparator, 8, 9 latch circuits to latch a luminance signal, 10 a subtraction circuit to compute a difference between the outputs of the latch circuits 8, 9, 11 a division circuit to perform a division of the outputs of the integration circuit 5 and of the subtraction circuit 10, 12 a movement detection signal output from the division circuit 11, and 14 an operation control circuit to control the latch operation in the latch circuits 8, 9 based on the output of the comparator 7 and the luminance difference signal 4, and to control the reset operation of the integration circuit 5 and other operation operations.

The frame memory 2 stores the image during a determined frame time. The subtraction circuit 13 effects the subtraction between the delayed signal 1, $g_{(1)}$, stored in the frame memory 2 and the present signal 2, $g_{(2)}$, to obtain the luminance difference signal 4.

FIGS. 3A–3D are operation explanatory drawings of the present apparatus, where the luminance signals only of an x-directional scan line are shown for convenience of explanation. In the drawings, signals 1, 3, 4, 6 correspond to those in FIG. 2.

Figure 3A:
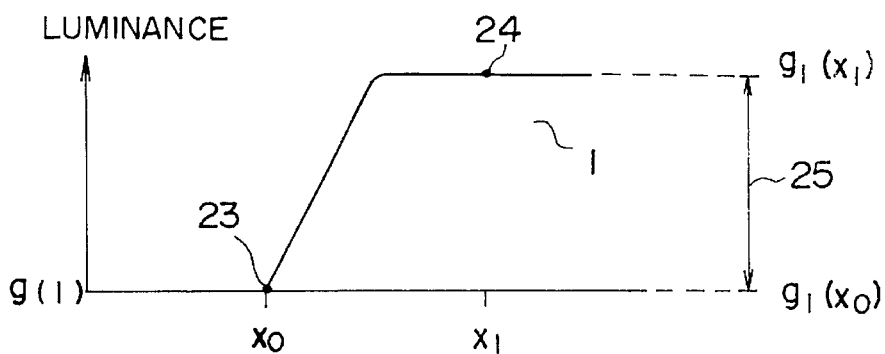
FIGS. 3A to 3D are drawings to illustrate a theory to detect a movement amount by the apparatus of the present invention.

FIG. 3A shows the signal 1, $g_{(1)}$, the right edge of which has a great luminance.

Figure 3B:
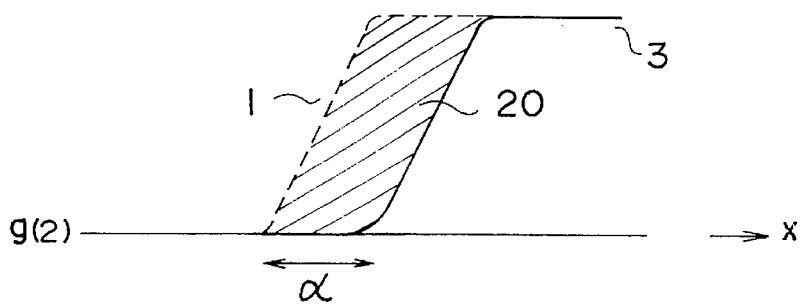

FIG. 3B shows the signal 2, $g_{(2)}$, the edge of which moved to the right.

In case of such edge movement, the superposed signals 1, 3 show the hatched region 20 corresponding to a change caused by the movement. Assuming that the region 20 is a parallelogram, the movement amount $\alpha$ corresponds to the base of the parallelogram. The movement amount $\alpha$ will be obtained by dividing the area of the region 20 by the height of the edge.

The movement detection apparatus of the present invention determines the movement amount based on the above theory.

In order to electrically obtain the area of the region 20, the luminance difference signal 4 is used, which is gained by subtraction of $g_{(1)}$ and $g_{(2)}$ at the subtraction circuit 13.

Figure 3C:
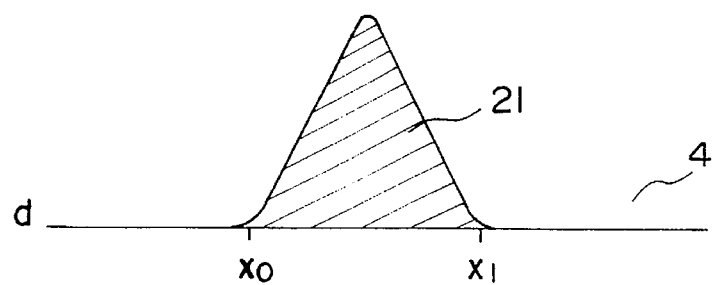
Figure 3D:
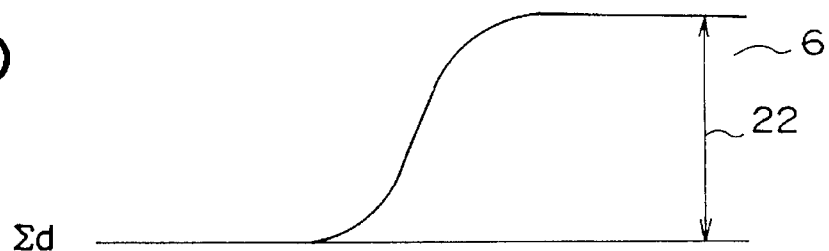

The luminance difference signal 4, as shown in FIG. 3C, is an electric signal of triangle or trapezoid shape, the area 21 of which is equal to that of the region 20. Then the luminance difference signal 4 is input into the integration circuit 5 for integration thereof, to obtain the signal 6 as shown in FIG. 3D. The signal 22 obtained is proportional to the area of the region 21.

Further, to obtain the edge height, a boundary is noted where the level of the luminance difference signal 4 becomes zero.

In FIGS. 3A–3D, $x_0$ is a point where the luminance difference signal 4 leaves zero and $x_1$ a point where it returns to zero. The luminance signals at those positions $x_0$, $x_1$ are detected.

Actually in FIG. 2, the luminance signals at $x_0$ and $x_1$ are so obtained that the latch circuits 8, 9 are operated at respective timings when the comparator 7 detects the zero points of the luminance difference signal 4, and so that the latch circuits 8, 9 latch the respective luminance signal levels at the zero points.

In detail, the comparator 7 detects a pixel which has the zero luminance difference signal, to generate a pulse, and the latch circuits 8, 9 store the luminance signal data of the image signal 1 in response to the pulse. Upon the latch, the latch circuits 8, 9 do not store the data of the identical pixel. The operation control circuit 14 controls the circuits 8, 9 so that they store the data at the ascending edge and the descending edge of the signal 4 discriminating them. In FIG. 2 the output luminance signals from the latch circuit 8, 9 are represented by 23, 24.

The subtraction circuit 10 computes a difference between the luminance signals 23, 24 to obtain the edge height of the signal 1. The signal is shown as 25 in FIG. 2. The dividing circuit 11 divides the signal value 22 by the signal value 25 to gain the movement signal 12 corresponding to the edge movement amount $\alpha$ as shown in FIG. 3B. At the same time, the operation control circuit 14 resets the integration circuit 5.

The above description refers only to the movement detection in the x-direction. A similar method is, however, applicable to the y-direction movement detection, for example, if the image stored in memory is vertically scanned for the read-out.

FIG. 3 illustrates an example of only one edge. Although actual images have more complex patterns, the apparatus of the present invention can detect the movement amount of such an actual image similarly.

Figure 4A:
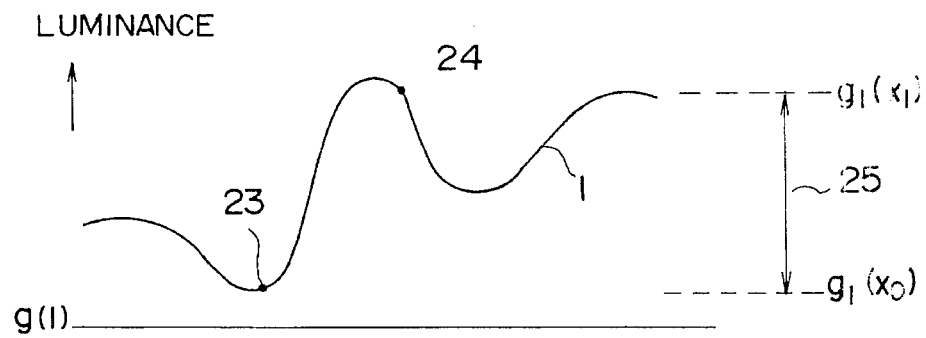
FIGS. 4A to 4D are drawings to illustrate another theory to detect a movement amount by the apparatus of the present invention.
Figure 4B:
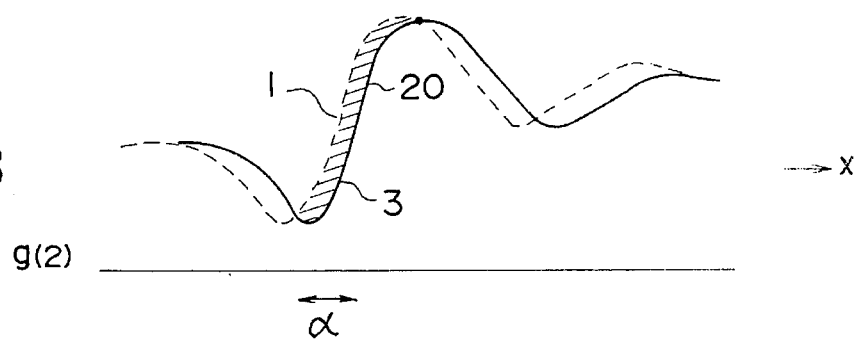
Figure 4C:
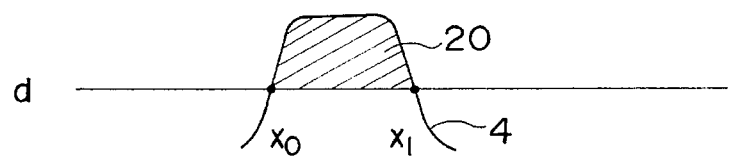
Figure 4D:
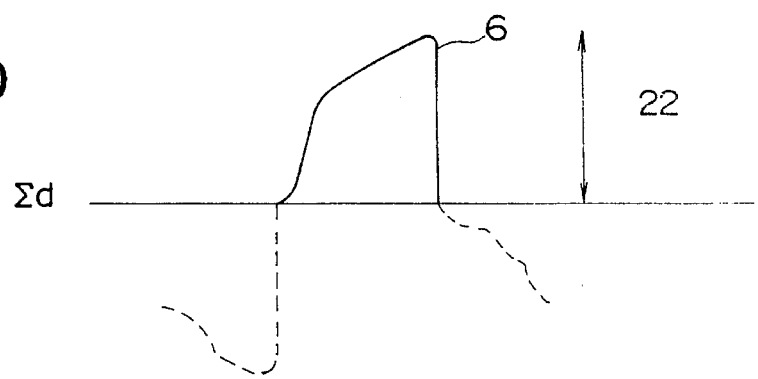

FIGS. 4A–4D show signal conditions of such an image. FIG. 4A shows a wave shape of an image signal or luminance signal, and FIG. 4B a present image signal 1 and an image signal 3 delayed by a determined time by the frame memory 2. In FIG. 4B the image signal shifts right by the amount α, so that a region 20 is formed like a waved parallelogram. FIG. C shows a wave shape of a luminance difference output from the subtraction circuit 13, and FIG. 4D that of integration output from the integration circuit 5.

The region 20 of the thus-deformed parallelogram as in FIG. 4B may be approximated by a parallelogram if the movement amount α is small enough compared with a period λ of image. Then the above-described method provides an accurate movement amount α.

Since the integration circuit 5 is reset for each pulse of the comparator by the operation control circuit 14, the movement amount of the watching edge is detected accurately.

Figure 1:
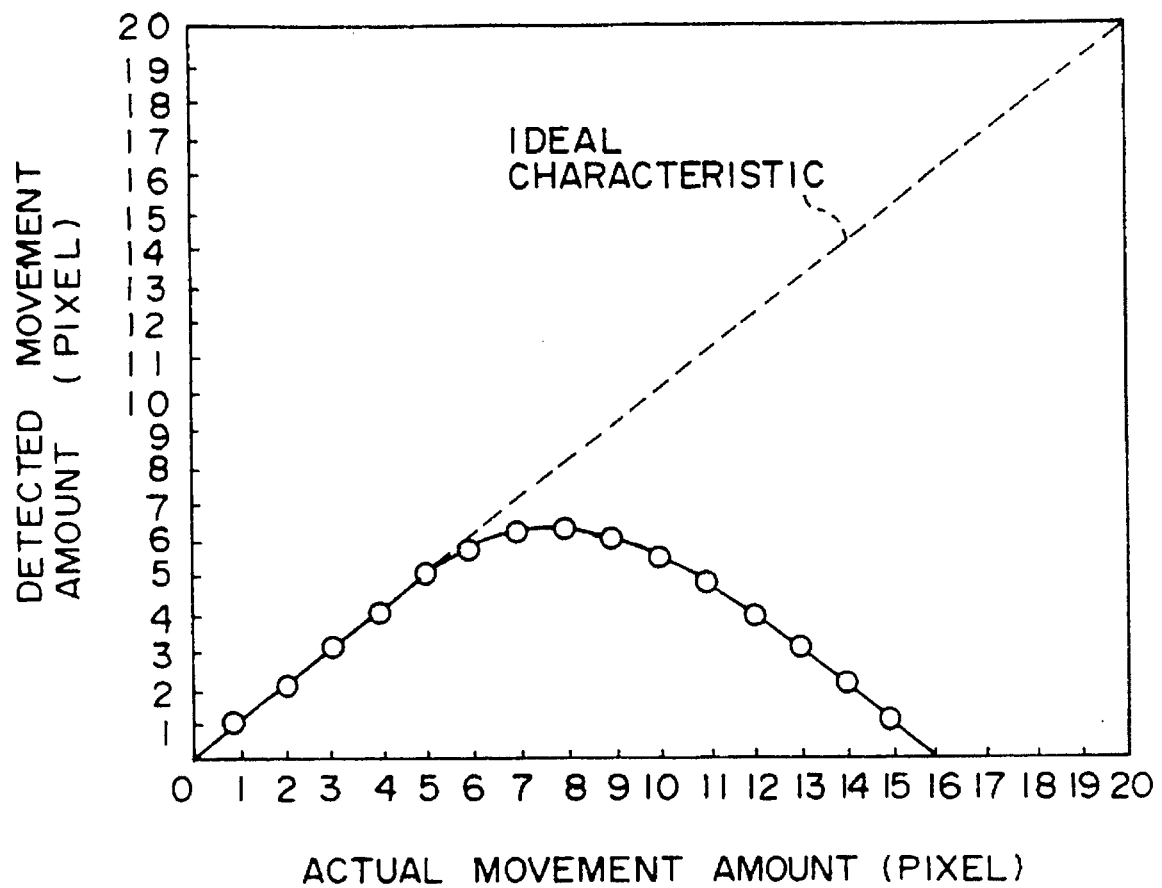
FIG. 1 is a diagram to show a movement detection property of a conventional movement detection apparatus.
Figure 5:
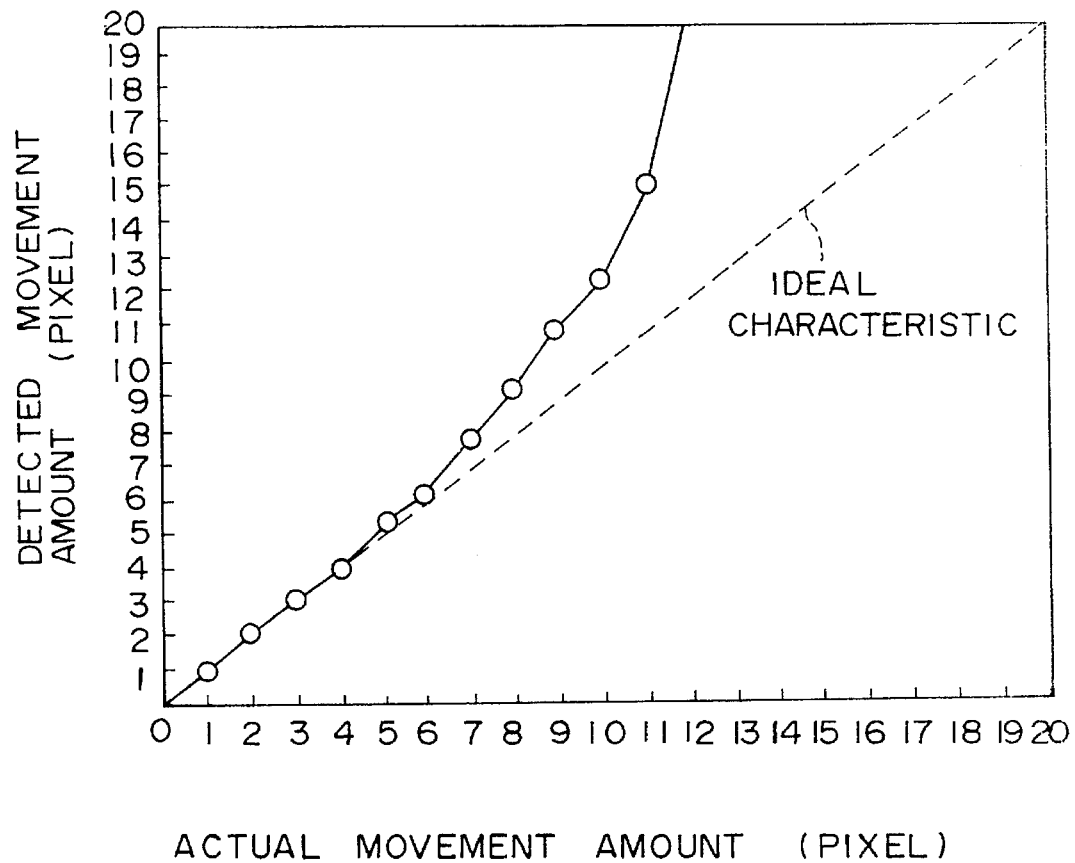
FIG. 5 is a diagram to show a movement detection property of the apparatus of the present invention.

In case of further greater movement, the geometrical approximation to the parallelogram will be difficult to apply. FIG. 5 shows a simulation result using an actual image to show the limit. The conditions of calculation are the same as the conventional example as explained referring to FIG. 1.

According to a simulation, the detection using the present apparatus shows less detection errors, for example, twelve pixels of detection for ten pixels of actual movement against five pixels of detection therefor by the conventional method.

Also, while the conventional method revealed the extreme errors upon detection of acceleration for the movement amount over a quarter of the subject pattern period λ due to the tendency to reduce the detected value, the above-detailed apparatus of the present invention remarkably improves the errors.

Furthermore, if the subject size, the pattern period, and the circle of least confusion are known, the curve of FIG. 5 is uniquely determined. Storing the curve in a ROM table and adjusting the detection properties leads to further improvement of detection precision.

In the above example of an image, the accurate detection can be attained within one pixel error up to twelve pixels or three eights of the subject pattern period λ even if considering calculation errors.

As explained above, the movement apparatus of the present invention achieved a great improvement in detection properties compared with the conventional apparatus.

Figure 6:
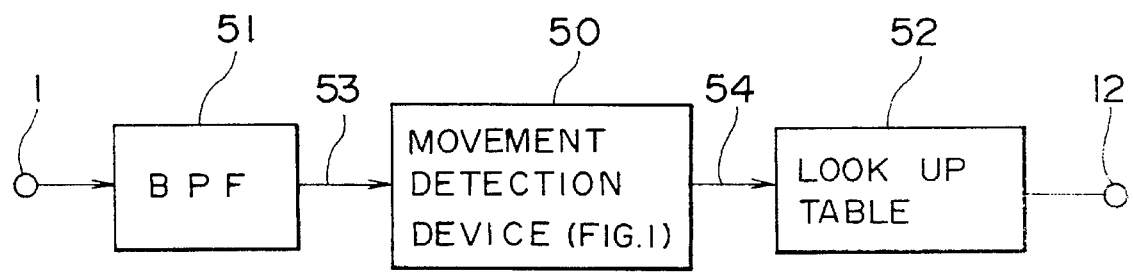
FIG. 6 is a block diagram to show another embodiment of the movement detection apparatus of the present invention.

FIG. 6 shows another embodiment of movement detection apparatus of the present invention with further modifications. The apparatus of this embodiment allows the detection of the movement amount with high precision without knowing the pattern size of the subject.

In FIG. 6, 50 denotes the movement detection apparatus of the first embodiment as shown in FIG. 2, 51 an image band pass filter as is abbreviated hereinafter as BPF, 52 a lookup table as is abbreviated hereinafter as LUT, 53 an output signal of BPF 51, and 54 an output signal of the movement detection apparatus 50. As explained before, the apparatus. 50 of the present invention has a close relation between the space gradient of the image and the detection range. Conversely, if a necessary detection range is determined, a suitable space gradient is also determined. This apparatus extracts only necessary component of space frequency using BPF 51 in the case of an unknown pattern size of subject.

Setting α' as a maximum of the movement amount to be obtained, the space frequency f to be extracted is given by the following:

$$f=1/\lambda=k \cdot 1/\alpha' \quad (3)$$

The value of k is preferably about ⅜.

The BPF 51 must be a two-dimensional filter when detecting both the movement amounts in the x-and y-directions. It is preferable that the phase property of BPF 51 be nearly linear in the band area of the pass.

The operation of LUT 52 is as follows. If a single frequency of signal 53 is extracted, the detection property of the apparatus 50 is uniquely determined. A curve 61 in FIG. 7 shows a detection property after BPF processing with λ=32 pixels. LUT 52 has a reciprocal number of the coefficient of the curve 61 to correct the curve into a line. A curve 62 in FIG. 7 shows the detection property after the correction. The output over a determined detection value is clipped in this embodiment.

The detection property may be linearized using LUT 52 as explained. Also, a non-linear detection property may be employed for some uses.

The movement detection apparatus of the present invention is arranged as explained. Explained next is an embodiment in which the movement detection apparatus is applied to a vibration correction device of a video camera.

Figure 8:
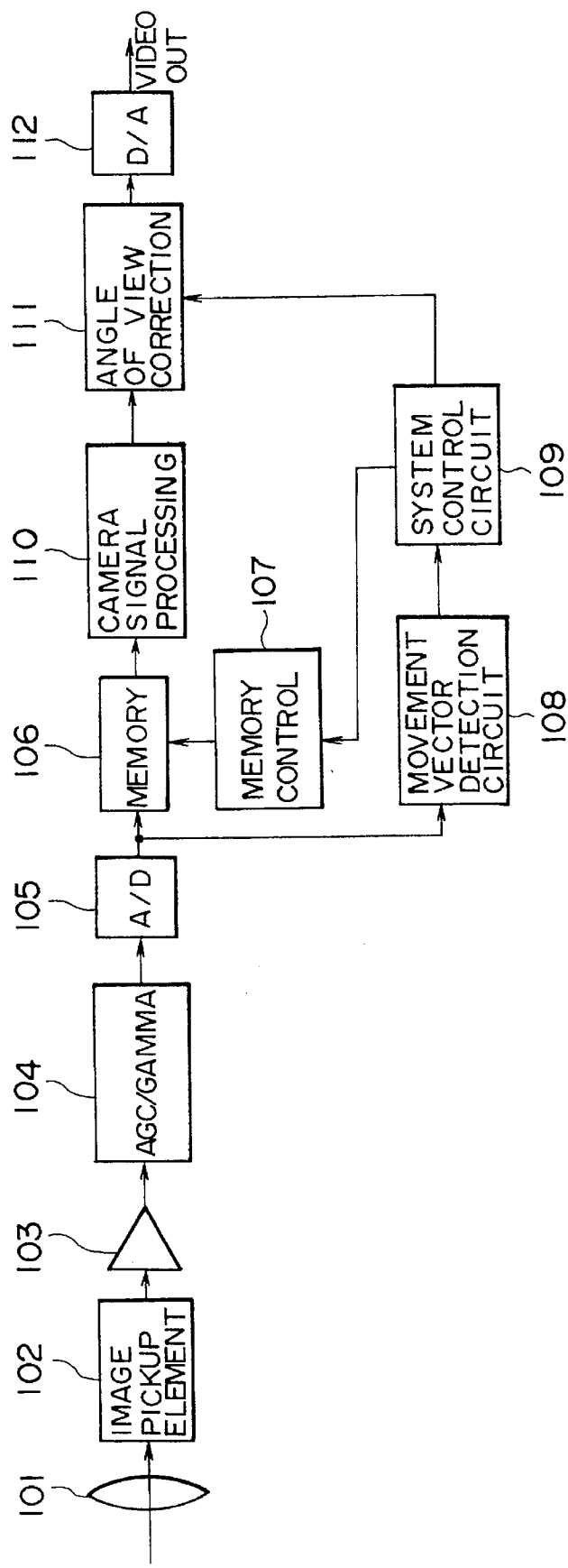
FIG. 8 is a block diagram to show the first example in which the movement detection apparatus of the present invention is applied to a vibration correction apparatus of a video camera.

FIG. 8 depicts a block diagram to show the third embodiment in which the movement vector detection apparatus of the present invention is used for a vibration correction device of a video camera.

In FIG. 8, 101 is a photographing lens optical system, 102 an image pickup element such as a CCD or the like to output a photoelectrically-converted image signals of a subject image focused on an image pickup screen by the optical system 101, 103 a preamplifier to amplify the image signal output from the image pickup element 102 up to a determined level, 104 a preliminary processing circuit to apply AGC to the input image signal to hold a constant level thereof and to effect processing of gamma control and others, 105 an A/D converter to convert the input analog image signal into a digital image signal, 106 an image memory to store one field of the digital image signal output from the A/D converter 105, and 107 a memory control circuit to control an address and a write-in rate upon reading the image into the image memory and to control a read-out address and a read-out rate of the image upon reading the image out of the image memory 106. The memory control circuit is controlled by a system control circuit 109 as explained later.

Number 108 denotes a movement vector detection circuit to detect the movement vector of the image from the image signal, the inner structure and the operation of which are similar to those in the circuit as shown in FIGS. 2 and 4 and, needless to say, effect the digital signal processing.

Number 109 is the system control circuit, comprising a microcomputer, to totally control the present apparatus, to compute vibration correction information from the movement vector information operated in the movement detection circuit 108, to control the memory control circuit 107 based on the above operation result, and to shift, upon reading the image out of the memory 106, the read-out position or read-out address on the memory in the direction of vibratory motion to kill the vibratory motion.

Number 110 is a camera signal processing circuit to effect determined signal processing on the readout image signal from the memory 106 to convert the signal into a normalized image signal, and 111 an angle-of-view correction circuit, being controlled by the system control circuit, to correct an angle of view of the image read out of the memory 106. In detail, the vibration correction is attained by shifting the read-out position of the image on the memory, so that the read-out image has a smaller angle of view by the shift range in the memory than the input image read into the memory. Then-the angle-of-view correction circuit 111 effects magnification of angle of view and compensation of the image so that the image has the same angle of view as one before the vibration correction.

The signal after the view angle correction is converted into an analog image signal by a D/A converter 112, and then supplied to an unshown monitor of a video recorder, electronic view finder or the like.

By the above arrangement, the vibration correction is attained so that the amount of vibratory motion is detected by obtaining the movement vector using the embodiments as shown in FIGS. 2 and 6, and then so that a read-out address is shifted in the direction to kill the vibration amount.

Figure 9:
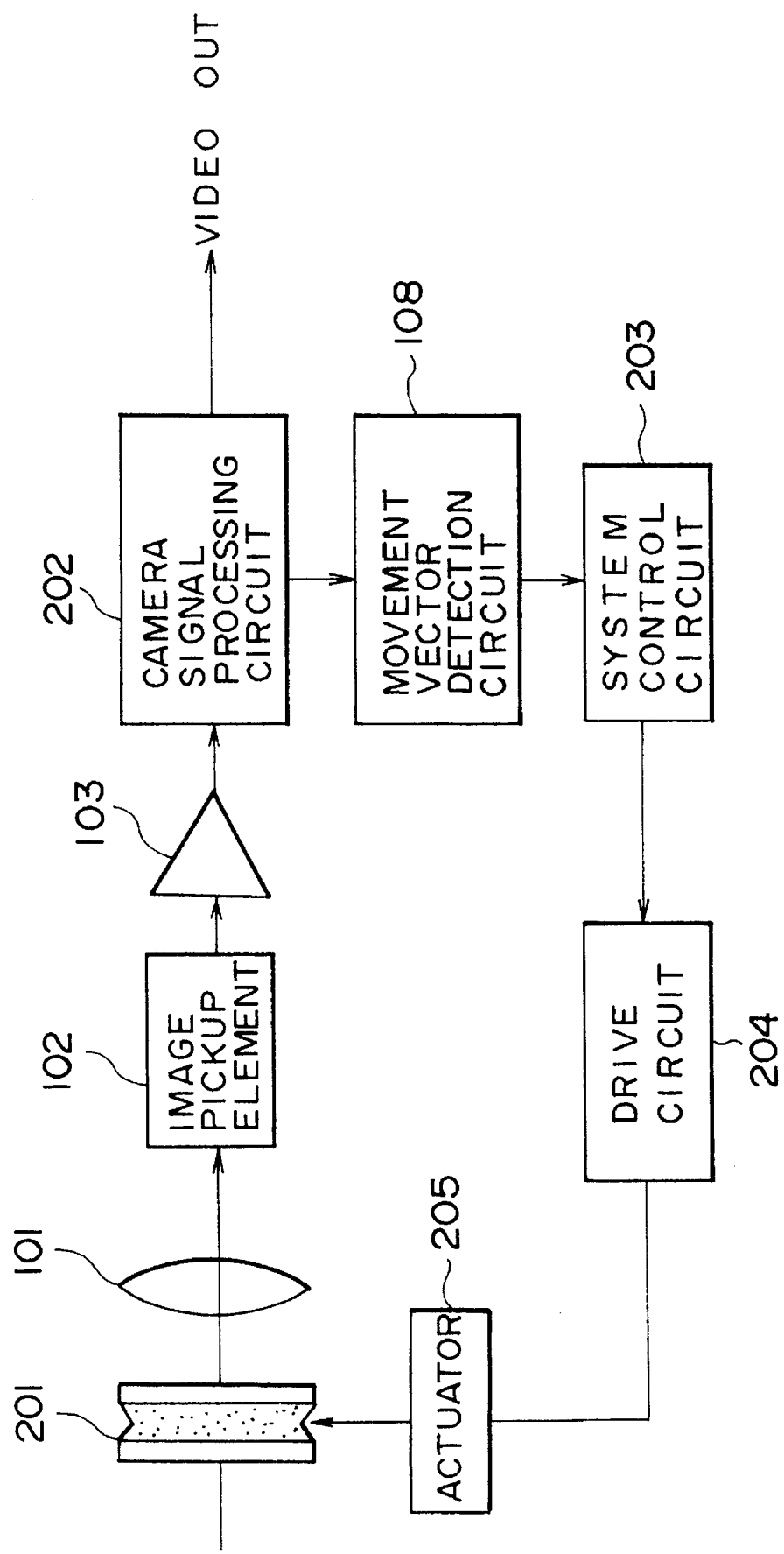
FIG. 9 is a block diagram to show the second example in which the movement detection apparatus of the present invention is applied to a vibration correction apparatus of a video camera.

FIG. 9 is a block diagram to illustrate another example of a video camera with a vibratory motion correction device using the movement vector detecting circuit of the present invention. The same components as in FIG. 8 have the same numbers, and are not explained further.

In FIG. 9, 201 is a variable vertical angle prism to correct a vibratory motion by varying the vertical angle or direction of the optical axis thereof. One example of the prism is an arrangement that silicone base liquid is sealed between two parallel glass plates to make variable the angle therebetween or vertical angle.

Number 202 is a camera signal processing circuit to output a normalized image signal converted from the output signal of the preamplifier, and 203 a system control circuit comprising a microcomputer to detect a direction and an amount of vibratory motion from the movement vector information supplied from the movement vector detecting circuit 108 and to compute an amount of driving of the variable vertical angle prism for the vibration correction. The correction information computed in the circuit 203 is supplied to the drive circuit 204, and an actuator 205 to vary the prism is driven in the direction and by the amount to kill the vibratory motion.

As in the embodiments, the vibration correction is attained so that the vibration amount is computed by detecting the movement vector from the image signal, and further so that the variable vertical angle prism is driven in the direction to correct the amount of vibratory motion.

In either of the above embodiments, a movement vector operation region is suitably and automatically set in response to a spatial frequency of the input image. This allows the elimination of a great error vector even in an area of undistinguishable pattern, which, in turn, leads to high space resolution with effective use of the space gradient information of the image. The detection precision may increase by eliminating from the operation region the sign changing area of the space gradient as a spacing between the detection blocks, since the time space gradient method is not well applied therein. Therefore, the vibration correction may be attained with high precision and secure operation.

As detailed above, the movement detection apparatus of the present invention with a simple structure may detect the accurate movement amount from an image at a high speed, and may provide more than two to three times the detection range as the conventional methods.

We claim:

1. A movement detection apparatus comprising:
   first means for detecting a difference signal between first and second image signals, the second signal being delayed by one frame from the first signal;
   second means for integrating the difference signal detected by said first means;
   third means for detecting a level of said first image signal when the difference signal detected by said first means reaches a zero point;
   fourth means for detecting a difference between the level detected by said third means at a first zero point and the level detected at a second zero point; and
   fifth means for dividing an output signal of said second means by an output signal of said fourth means to detect a signal corresponding to image movement.

2. A movement detection apparatus according to claim 1, wherein said first and second image signals comprise luminance signals.

3. An apparatus according to claim 1, wherein said first means detects an edge portion of an image by calculating a difference between the first image signal and the second image signal.

4. An apparatus according to claim 3, wherein said third means detects displacement over time, caused by movement of the edge portion and detects levels of luminance signals at a beginning and an end of the displacement during a time interval.

5. An apparatus according to claim 4, wherein said first, second, third, fourth, and fifth means detect an edge component of a luminance signal level in at least one of a horizontal and a vertical direction of a picture.

6. A movement detection apparatus for use with an image pickup means which converts an optical image into an electrical signal to output an image signal, said apparatus comprising:
   first operation means for outputting a difference signal between first and second image signals both of which are outputted from the image pickup means at different times;
   detection means for detecting a level of said first image signal when the difference signal detected by said first operation means reaches a zero point;
   second operation means for determining a difference between the level detected at a first zero point and the level detected at a second zero point by said detection means; and
   third operation means for effecting a predetermined operation on output signals of said first and second operation means to output a signal corresponding to image movement.

7. An apparatus according to claim 6, wherein said first operation means outputs a difference of a luminance signal of the image signal.

8. An apparatus according to claim 6, wherein said first operation means detects an edge portion by calculating a difference between the first image signal and the second image signal.

9. An apparatus according to claim 8, wherein said detection means detects displacement over time, caused by movement of the edge portion and detects levels of luminance signals at a beginning and an end of the displacement during a time interval.

10. An apparatus according to claim 9, wherein said third operation means comprises an addition integration circuit for addition integration of an output of said first operation means and calculates a movement amount of the image based upon a result of dividing a value of addition integration from the first zero point to the second zero point by an output of said second operation means.

11. A movement compensation apparatus for compensating image movement detected in a received image signal, comprising:
   filtering means for receiving a plurality of image signals and extracting a predetermined frequency component from each of the plurality of received image signals;
   first operation means for determining a difference between predetermined frequency components extracted from the plurality of received image signals by said filtering means;

storage means for storing outputs of said filtering means when an output of said first operation means reaches a predetermined level;

second operation means for processing the output of said first operation means after integration of the output of said first operation means, and an output of said storage means reflecting a difference between outputs stored in said storage means, to detect information of image movement from said image signal; and compensation means for compensating said information of image movement on the basis of an output of said second operation means.

12. An apparatus according to claim 11, wherein said filtering means is a band pass filter for extracting a spatial frequency component suitable for movement detection from a luminance signal.

13. An apparatus according to claim 4, wherein said first operation means detects an edge portion of an image by calculating a difference between said plurality of image signals.

14. An apparatus according to claim 13, wherein storage means stores an output of said filtering means, which is provided when an output of said first operation means becomes zero.

15. An apparatus according to claim 14, wherein said storage means detects displacement over time, caused by movement of the edge portion and detects levels of luminance signals at a beginning and an end of the displacement during a time interval.

16. An apparatus according to claim 4, wherein said compensation means comprises:

a memory for storing the image signals of at least one picture; and a memory control circuit for controlling an image read-out position of said memory, wherein said compensation means controls said memory control circuit according to the information of image movement output from said second operation means to correct the movement of the image by shifting the image read-out position of said memory in a direction in which the movement is cancelled.

17. An apparatus according to claim 4, wherein said compensation means comprises a movement correction optical system for optically shifting an incident image and said compensation means corrects the movement of the image by moving said movement correction optical system in a direction in which the movement is cancelled, according to the information of image movement output from said second operation means.

18. An image sensing apparatus, comprising:

an image sensor for converting an image formed on an image sensing plane to an image signal;

a band pass filter for receiving the image signal and extracting a predetermined frequency component signal;

a first operation circuit for determining a difference between the predetermined frequency component signals serially output from said band pass filter;

a memory for storing outputs of said band pass filter when a difference output from said first operating circuit reaches a predetermined level;

a second operation circuit for receiving operating the output of said first operation circuit and reads out outputs from said memory to detect information of image movement from said image signal; and a movement compensation device for compensating said information of image movement on the basis of an output of said second operation circuit.

19. An apparatus according to claim 18, wherein said band pass filter extracts a spatial frequency component suitable for movement detection from a luminance signal.

20. An apparatus according to claim 18, wherein said first operation circuit detects an edge portion of an image based upon the difference between the predetermined frequency component signals.

21. An apparatus according to claim 20, wherein the predetermined level is zero.

22. An apparatus according to claim 21, wherein said memory is used to detect displacement over time, caused by movement of the edge portion and detects levels of luminance signals at a beginning and an end of the displacement during a time interval.

23. An apparatus according to claim 18, wherein said movement compensation device comprises:

an image memory for storing the image signals of at least one picture; and a memory control circuit for controlling an image read-out position of said image memory, wherein said movement compensation apparatus controls said memory control circuit according to an output of said second operation circuit to correct the movement of the image by shifting the image read-out position of said image memory in a direction in which the movement of the image is cancelled.

24. An apparatus according to claim 18, wherein said movement compensation device comprises a movement correction optical system for optically shifting an incident image and said movement compensation device corrects movement of the image by moving said movement correction optical system in a direction in which the movement of the image is cancelled, according to the output of said second operation circuit.

\* \* \* \* \*

UNITED STATES PATENT AND TRADEMARK OFFICE
CERTIFICATE OF CORRECTION

PATENT NO. : 5,579,045
DATED : November 26, 1996
INVENTOR(S) : MASAYOSHI SEKINE, ET AL.

It is certified that error appears in the above-indentified patent and that said Letters Patent is hereby corrected as shown below:

COLUMN 2

Line 15, "U.S. Pat. No. 4788596" should read --U.S. Pat. No. 4,788,596--.
Line 19, "U.S. Pat. Nos. 5031049;" should read --U.S. Pat. Nos. 5,031,049;--.

COLUMN 3

Line 52, "operation" should be delete.

COLUMN 5

Line 35, "eights" should read --eighths-- and "if" should read --when--.
Line 52, "apparatus." should read --apparatus--.

COLUMN 6

Line 25, "a" (first occurrence) should be deleted.
Line 66, "Then-the" should read --Then the--.
Line 67, "of" should read --of the--.

Signed and Sealed this

Third Day of June, 1997

Attest:

BRUCE LEHMAN

Attesting Officer

Commissioner of Patents and Trademarks